J. H. HOLT.
VEHICLE SCOTCH.
APPLICATION FILED OCT. 31, 1914.
1,141,798.
Patented June 1, 1915.
2 SHEETS—SHEET 2.
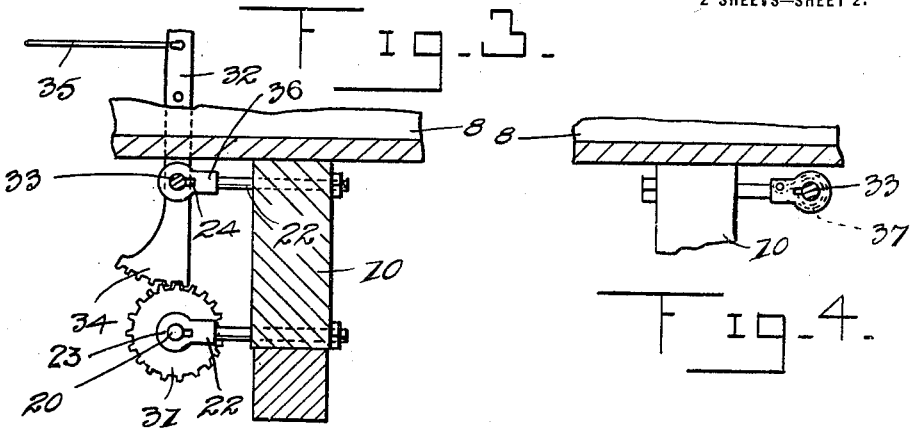
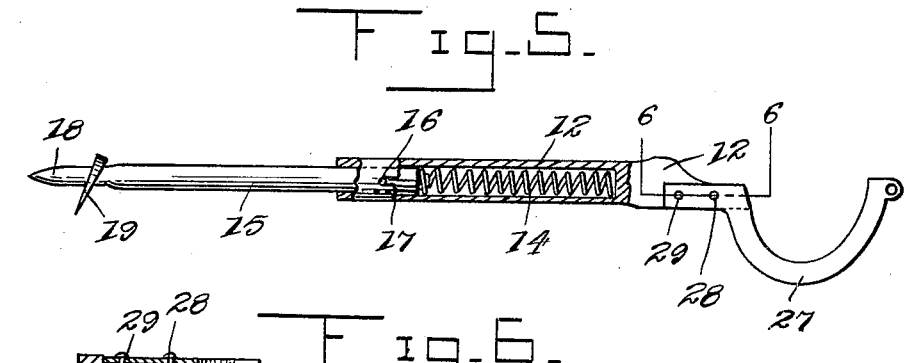
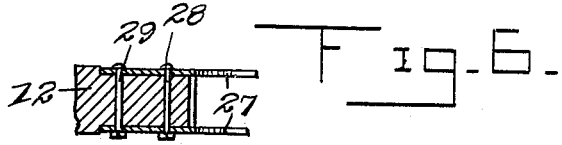
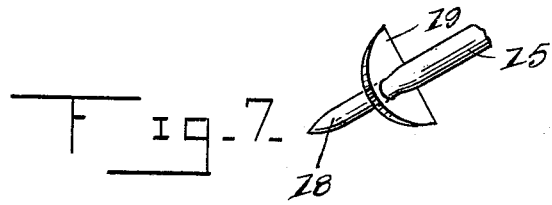
Witnesses
C. R. Bealle
Chas. F. Churn
Inventor
J. H. Holt,
By H. Randolph Jr.
Attorney
THE NORRIS PETERS CO., PHOTO-LITHO., WASHINGTON, D. C.

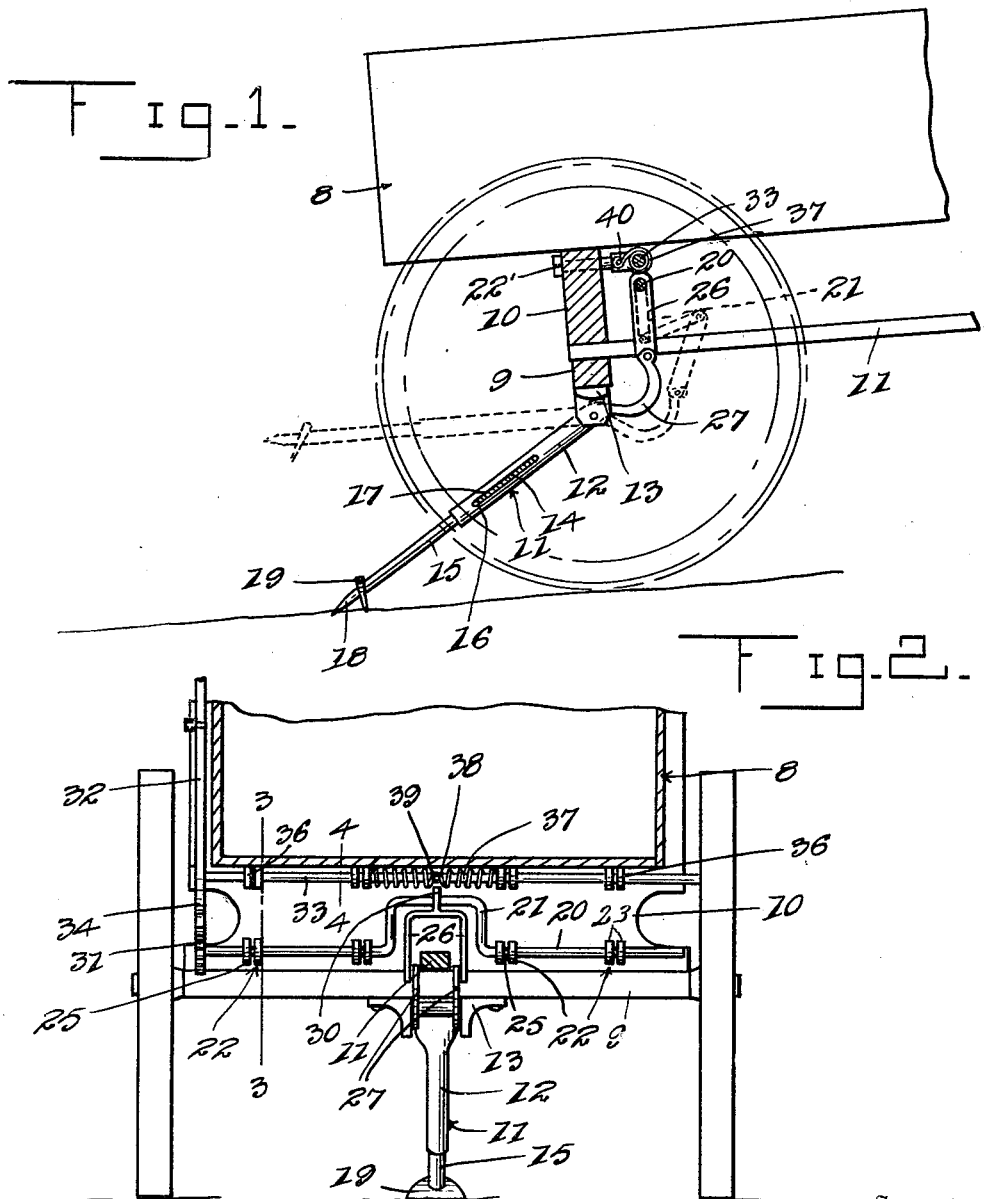

UNITED STATES PATENT OFFICE.

JOHN H. HOLT, OF LAWRENCEBURG, TENNESSEE.

VEHICLE-SCOTCH.

1,141,798. Specification of Letters Patent. Patented June 1, 1915.

Application filed October 31, 1914. Serial No. 869,610.

*To all whom it may concern:*

Be it known that I, JOHN H. HOLT, a citizen of the United States, residing at Lawrenceburg, in the county of Lawrence and State of Tennessee, have invented certain new and useful Improvements in Vehicle-Scotches; and I do hereby declare the following to be a full, clear, and exact description of the invention, such as will enable others skilled in the art to which it appertains to make and use the same.

My invention relates to new and useful improvements in vehicles and more particularly to an attachment therefor which will assist the starting of a vehicle and thus relieve the animal or animals from the strain incident to the load of said vehicle and enable the animal or animals to pull a heavier load.

Spirited or balky animals often break or damage the harness incident to the animal jumping against the load, particularly on a hill, and it is therefore an object of my invention to provide a scotch of the character described which will assist the starting of the vehicle, relieve the animal or animals from the strain incident to the load, thus preventing the above objection and enabling the animal to pull a heavier load.

A still further important object of my invention is to provide a vehicle scotch of the character described which may be readily attached to vehicles, is simple as to construction, reliable and efficient in operation and cheap to manufacture.

The above and additional objects are accomplished by such means as are illustrated in the accompanying drawings, described in the following specifications and then more particularly pointed out in the claims which are appended hereto and form a part of this application.

With reference to the drawings, wherein I have illustrated the preferred embodiment of my invention as it is reduced to practice, and throughout the several views of which similar reference numerals designate corresponding parts, Figure 1 is a sectional view showing my device in assembled position upon a vehicle, the dotted lines indicating the position assumed when the device is not in use, Fig. 2 is a transverse sectional view taken through the rear portion of a vehicle and showing my device attached and in operative position, Fig. 3 is a vertical sectional view taken on line 3—3 of Fig. 2 showing the operating lever and coöperating parts, Fig. 4 is a sectional view taken on line 4—4 of Fig. 2 showing the detail securing arrangement for a portion of the operating mechanism for the device, Fig. 5 is a longitudinal fragmentary sectional view taken through the pivoted road engaging element forming a part of my device, Fig. 6 is a sectional view taken on line 6—6 of Fig. 5 showing the detail securing arrangement for the road engaging element, and connecting means therefor, and Fig. 7 is a detail perspective view of the operative end of the road engaging element showing the means thereon for preventing the sinking of the road engaging element into the road too far.

Referring to the drawings by characters of reference, the numeral 8 designates as an entirety a vehicle of the usual construction having a rear axle 9, rear bolster 10 and reach 11.

My vehicle scotch is adapted to be secured to the vehicle 8 adjacent to the rear bolster and rear axle 10 and 9 respectively.

My vehicle scotch consists of a road engaging element designated 11 as an entirety. This road engaging element 11 comprises a tubular rod 12 that is pivoted in a bracket 13 which is secured in any suitable manner to the under face of the rear axle 9 at a point approximately centrally of the ends thereof. A helical expansion spring 14 is mounted within the tubular rod or member 12 and is designed to bear against one terminal of a road engaging rod 15. The road engaging rod 15 is slidable within the tubular member 12 and is provided at its inner end with a transverse guide pin 16 that is slidable in a pair of opposed longitudinal slots 17 formed adjacent the lower end of the member 12. The pin and slot arrangement described prevents the derangement of the road engaging element 11 as will be clearly seen with reference to Figs. 1 and 5 in the drawings.

The free end of the road engaging rod 15 is preferably sharpened as at 18 to provide a point to bite into the road. I provide a preferably semi-circular plate 19 that is carried adjacent but spaced from the end of the rod 15 and which prevents the pointed end 18 of the rod 15 from sinking too far into the ground. The plate 19 is adapted to engage the road along its straight edge at which point the plate is chamfered, preferably, to provide gripping engagement with the road surface. The plate 19 is preferably arranged angularly with relation to the vertical axis of the rod 15 as will be clearly seen with reference to Fig. 5 in the drawings. This provides an efficient gripping of the road surface.

A crank shaft 20 having a crank portion 21 formed centrally of its ends is rotatably mounted upon preferably the inner face of the rear bolster 10 of the vehicle 8. I preferably provide securing brackets 22 that are inserted through the bolster 10 and have nuts turned upon their inner threaded terminals. These brackets 22 are enlarged and bifurcated and apertured at their outer ends as at 23 to rotatably support the crank shaft 20 and are arranged in spaced relation to the inner face of the bolster 10 sufficiently at their portions 23 to permit the free movement of the crank shaft 20. The apertured enlarged portion 23 may be provided with key slots or recesses 24 to facilitate the positioning of the crank shaft 20 within the portions 23 of the brackets 22. The crank shaft 20 is provided with a plurality of projecting pins or lugs 25 that extend between the sides of the member 23 in the bifurcation thereof. This arrangement prevents derangement of the crank shaft 20. In mounting the crank shaft it is preferably disposed above the reach 11, that is the crank portion 21 is arranged with its sides upon either side of the reach so as to permit proper movement of the crank shaft.

As a means for connecting the road engaging member 11 with the crank shaft, I provide a preferably U-shaped link 26 that is pivoted at its free ends to the ends of arcuate connecting bars 27. The connecting bar 27 are approximately semi-circular and are fixed by pins 28 and 29 that are inserted through the bars 27 and inner solid end of the tubular pipe 12.

The pin 29 serves as the pivot pin for the tubular pipe 12 and is journaled in the bracket 13 while the pin 28 serves to hold the bars 27 against movement relative to the tubular pipe 12. The sides of the solid portion of the tubular pipe 12 are preferably recessed to facilitate the flush positioning of the bars 27 relative to the pipe 12. An apertured ear 30 is formed centrally of the ends of the U-shaped link 26 and is positioned upon the central portion of the crank portion 21 of the crank shaft 20. It will thus be seen that when the crank shaft 20 is rotated the road engaging member 11 is, through the medium of the bars 27 and link 26, moved into and out of engagement with the road according to the direction of the rotation of the shaft 20.

As a means for rotating the crank shaft 20 I provide a gear wheel 31 that is arranged upon one end of the shaft 20 in fixed relation thereto. This gear wheel may be arranged upon either end of the shaft if so desired. An oscillatory operating lever 32 is fixed intermediate its ends upon one end of a rotatable shaft 33 and provided at its lower or inner end with a toothed segmental portion 34 that is adapted to operatively engage the gear wheel 31. This lever 32 is arranged upon the sides of the body of the vehicle 8 and may be connected with some suitable lever arrangement adjacent to the driver's seat of the vehicle by means of a connecting rod 35 that is pivoted to the upper end of the lever 32. The shaft 33 is rotatably secured upon the inner face of the rear bolster 10 in superposed relation to the crank shaft 20 by means of brackets 36 similar to the ones 22 previously described in connection with the crank shaft 20.

As a means for normally holding the road engaging member 11 in inoperative position as shown in dotted lines in Fig. 1 in the drawings, I provide a helical spring 37 that is mounted upon the central portion of the shaft 33. This spring 37 is provided centrally of its ends with an angular loop 38 that is arranged to engage a pin 39 carried upon the shaft 33 to prevent movement of the spring in one direction relative to the shaft 33. The free ends of the spring are secured to the adjacent supporting bracket 36 as at 40 upon the sides thereof. The spring 37 serves to normally hold the road engaging element 11 in spaced relation to the road surface as illustrated in dotted lines in Fig. 1 of the drawings.

To operate the device so that the point 18 of the rod 15 engages the road surface and assuming that the device is in the position illustrated in dotted lines in Fig. 1, a pull or push as the case may be is given to the rod 35 causing the lever 32 to move and bring about the subsequent turning of the shaft 20. When the crank shaft 20 is moved as described the road engaging element 11 is allowed to drop into position illustrated in Fig. 1 so that the point 18 and plate 19 engages the road surface. If the vehicle is ascending a hill the driver brings the draft animals to stop, the point 18 embeds itself within the road surface and the weight of the load is taken up by the spring 14 arranged in the tubular pipe 12. When this action takes place the vehicle is prevented from downward movement upon the hill and it will be readily seen that when the animals begin to pull that the strain is relieved incident to the starting of the vehicle by the spring 14 described. By manipulation of the lever 32 the device assumes its normal position. This action is assisted by the spring 37 as will be readily observed.

It will be readily seen with reference to the foregoing description and accompanying drawings that I have provided a simple and inexpensive vehicle scotch which may be readily attached to vehicles of all characters and which will operate to accomplish all functions hereinbefore recited in a reliable and expeditious manner.

What is claimed is:—

1. A vehicle scotch comprising a road engaging member pivoted adjacent the rear of the vehicle and comprising a pair of telescoping members and a spring arranged between the telescoping members, a crank shaft, a pair of curved bars carried by said road engaging member, a link connecting said bars with said crank shaft, means for rotating said crank shaft, means for normally holding the road engaging member in spaced relation to the road and means carried adjacent to the outer end of the outermost of said telescoping members to engage the surface of the road in combination with the adjacent outer end of said outermost telescoping member.

2. A scotch for vehicles comprising a tubular member pivoted on said vehicle, a pointed road engaging rod slidable within the tubular member, cushioning means arranged within the tubular member to engage the inner end of said rod, a pair of curved bars secured adjacent the pivoted end of said tubular member, a crank shaft rotatably mounted on the vehicle, a U-shaped link pivotally connected with the crank shaft and said curved bars, a shaft journaled upon said vehicle, a lever fixed on said shaft and having a toothed segmental lower terminal, a gear wheel fixed on said crank shaft, and engaging said toothed segmental portion and means for normally holding said road engaging member in spaced relation to the road.

3. In combination with the rear bolster of a vehicle, a pair of shafts journaled on the bolster and arranged one above the other, a scotch carried by the lowermost shaft and adapted to engage the surface of the road when the shaft is rotated in one direction, an operating lever carried by the upper shaft and having connection with the lowermost shaft, and a spring encircling the upper shaft adapted to automatically return the scotch to normal position when the operating lever is released.

In testimony whereof I affix my signature in presence of two witnesses.

JOHN H. HOLT.

Witnesses:
JAMES D. VAUGHAN,
CHAS. H. McLEAN.

Copies of this patent may be obtained for five cents each, by addressing the "Commissioner of Patents, Washington, D. C."